Patented July 21, 1931

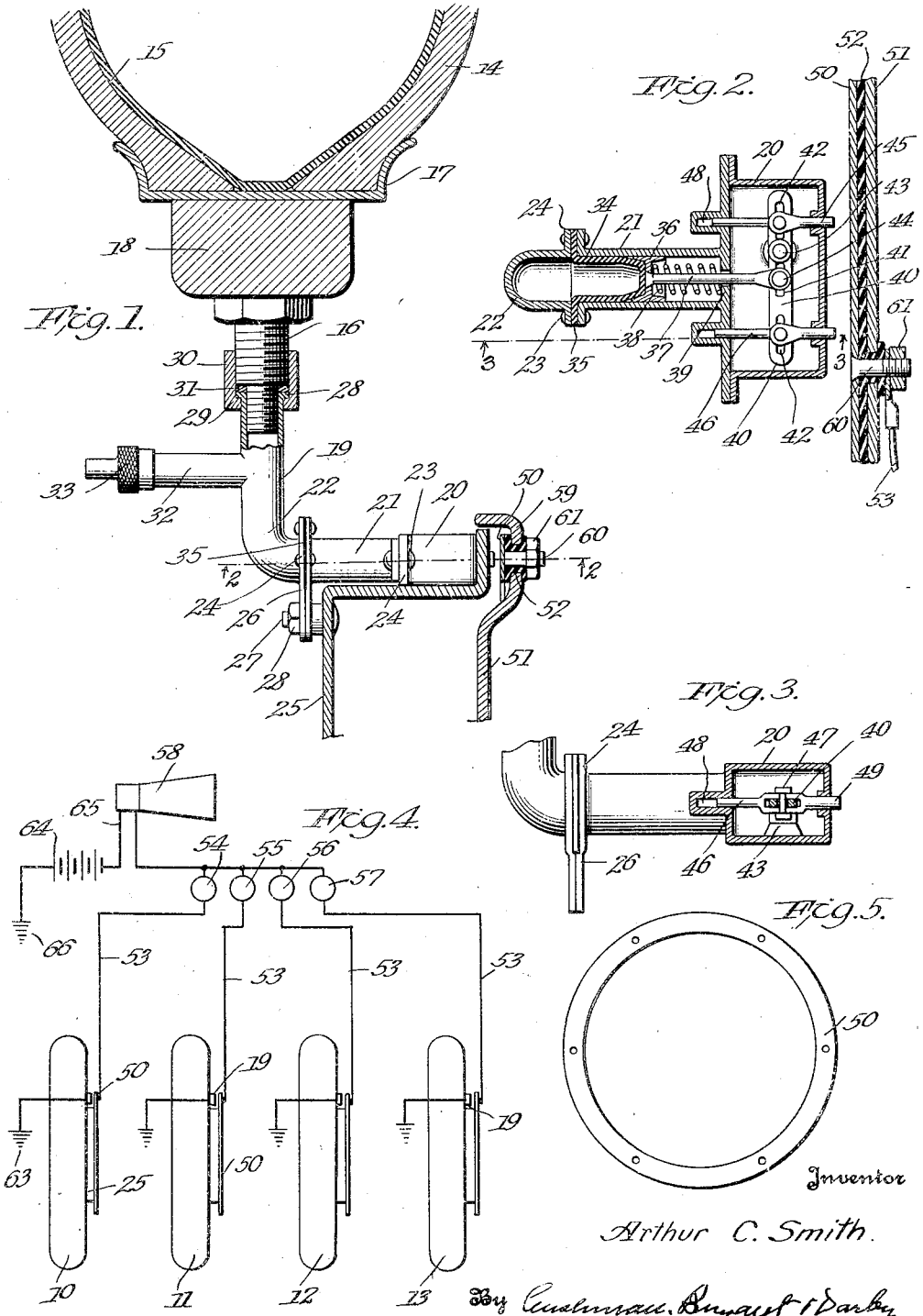

1,815,806

UNITED STATES PATENT OFFICE

ARTHUR C. SMITH, OF ALLEYTON, TEXAS, ASSIGNOR OF ONE-HALF TO L. T. EVERETT, OF ALLEYTON, TEXAS

PRESSURE SWITCH

Application filed April 30, 1930. Serial No. 448,631.

The present invention relates to improvements in the construction and operation of pressure indicators for pneumatic tires and the like.

It is a well recognized fact that the life and wearing qualities of pneumatic tires are materially prolonged, if the tires are maintained at a proper and even pressure.

It is, therefore, a primary object of the present invention to provide simple, efficient and economical means for indicating to the driver when the pressure in any of the tires exceeds or falls below a predetermined limit.

A further object comprehends the provision of means responsive to variations in the pressure of each of the tires for closing an electric circuit, so as to operate an audible or visual signaling device or both simultaneously.

Another object of the invention consists in operatively associating movable contact fingers with a stationary contact whereby the fingers are selectively or alternately moved into engagement with the fixed contact to close an electric circuit when the pressure in the tire becomes too great due to overexpansion by heat or other causes, or when the pressure falls below the proper pressure that should be maintained.

Further objects and advantages of the invention will become apparent from the following description, when taken in conjunction with the accompanying claims and drawings.

Referring to the drawings in which is shown a preferred embodiment,

Figure 1 is a fragmentary view, with parts in section, of a vehicle wheel showing the indicator associated therewith.

Figure 2 is a section view taken substantially along the line 2—2 of Figure 1.

Figure 3 is a sectional view taken substantially along the line 3—3 of Figure 2.

Figure 4 is a diagrammatic view showing the electrical connection of the signaling device with each of the wheels of a motor vehicle, and Figure 5 is a detail view of the fixed contact.

Referring to the drawings in which like numerals designate like parts in the several views, and more particularly Figures 4, 10, 11, 12 and 13 represent the front and rear wheels of a motor vehicle, each of the wheels having mounted thereon a pneumatic tire 14, the inner tube 15 of which has its threaded valve stem 16 extending through the rim 17 and felly 18.

In order that the driver may be immediately informed when the pressure in any of the tires exceeds or falls below the normal pressure which should be maintained, there is provided a pressure indicator having a housing 19, preferably composed of the sections 20, 21 and 22 (Fig. 1) that are connected together by the bolts 23, which extend through the opposed flange portions 24 of each of the sections. Manifestly, the housing 19 may be made integral, but for practical purposes, it has been found desirable to make it in sections in the manner as shown. The housing 19 is arranged to be carried by the wheel and is preferably mounted on the brake drum 25 through the instrumentality of the depending arms 26, which are clamped to the drum by the bolts 27 and nuts 28.

The elbow portion or section 22 of the housing may be conveniently attached to the valve stem of the tire, so as to be readily installed on any type of wheel and has its free end terminating in an annual flange 28', which co-acts with a complementary flange 29 on the coupling nut 30 for detachably securing the indicator to the valve stem 16. In order to insure a tight joint being formed between the parts a packing 31 is preferably positioned between the flange 28 and the adjacent face of the valve stem 16. The section 22 has extending laterally therefrom a tubular portion or arm 32, in which is mounted a self-seating valve that ordinarily is positioned within the valve stem 16, for controlling the supply of air to the tube 15. The outer end of the arm 32 is normally closed by the cap 33.

Mounted within the section 21 of the housing is a flexible thimble or cup 34, preferably of rubber, which is formed with an annular flange 35 arranged to be interposed between the flanges 24 and clamped in position by the bolts 23 that secure the sections together.

The thimble 34 is directly exposed to the pressure of the air in the tube 15 and the section 22 of the housing, consequently its axial expansion will be responsive to the variation of the pressure in the tube 15. Associated with the thimble 34 and slidably mounted in the section 20 is a reciprocating piston 36, which is connected to a rod 37 that extends into the elongated section 20 of the housing (Fig. 2). A coil spring 38 is confined between the piston 36 and the flange portion 39 of the section 21, so as to exert a pressure sufficient to counter-act the normal air pressure in the tire 14, which pressure tends to maintain the nipple 34 distended to its normal position as shown in Figure 2. Positioned within the section 20 of the housing and transversely disposed relative to the piston rod 37 is an operating lever 40, which is provided with a central slot 41 and the end slots 42, and is pivotally connected to the housing as at 43 at a point between the central slot 41 and one of the end slots 42 for a purpose which will be subsequently described. The free end of the piston rod 37 is connected as at 44 to the central slot 41, while the movable contact fingers 45 and 46 are pivotally secured in each of the slots 42 by the pins 47 in the manner as shown in Figure 3. The inner end of each of the contact fingers 45 and 46 is slidably mounted in the recessed portion 48 of the section 20, while their outer ends 49 extend a limited distance beyond the housing, so as to be moved by the actuation of the rod 37 into engagement with a fixed annular contact member 50, that is carried by the stationary portion 51 of the brake drum or vehicle and separated therefrom by a strip of any suitable insulated material such as 52. The fixed contact 50 is electrically connected by the wire 53 to any suitable signaling device, such as the lights 54, 55, 56 and 57, that may be mounted on the dash of the vehicle, so as to be positioned convenient to the driver. Additionally, an audible signal such as a horn or the like 58 may be inserted in the circuit, so that when the switch is turned on and either of the movable contacts 45 or 46 is moved into engagement with the fixed contact 50, a circuit is established which simultaneously turns on one of the lights and sounds the horn. The fixed contact 50 may be carried in an annular offset portion 59 (Fig. 1) formed in the stationary support 51 and is detachably connected thereto by a series of peripherally spaced bolts 60 and nuts 61 (Fig. 5). As the heads of the bolts 60 are flush with the exposed face of the fixed contact or run ring 50, the wire 53 is preferably connected to one of the bolts 60, so as to establish a closed circuit when either of the movable contacts are brought into engagement with the fixed contact.

Referring to Figure 4 of the drawings, it will be seen that each of the wheels of the vehicle is provided with a pressure indicator 19, which, when either of the fingers 45 or 46 is moved into engagement with the fixed contact 50, closes an electric circuit that lights one of the bulbs 54, 55, 56 and 57 on the dash and also operates the horn 58. The movable contacts 45 and 46 may be grounded on the metallic part of the drum as indicated by the numeral 63, while a battery 64 carried by the vehicle may be connected to the circuit adjacent the horn 58 by the wire 65 and is grounded as at 66, so as to provide a closed circuit when the pressure in any of the tires exceeds or falls below the proper pressure that should be maintained.

In operation, the spring 38 is first adjusted to exert sufficient pressure to counter-act the normal air pressure in the tire which tends to maintain the nipple 34 in its distended position, so that this piston 36 and its associated parts are relatively stationary. Should the pressure in the tire 14 fall below normal, the nipple 34 will be contracted by the increased pressure of the spring 38, thus causing the piston 36 to move outwardly or to the left as shown in Figure 2, which, in turn, actuates the lever 40, so as to cause the latter to move about its pivot or fulcrum 43 and bring the finger 45 into engagement with the fixed contact 50, thus closing the circuit and causing one of the lights to be lit and the horn to sound. On the other hand, should the pressure in the tire 14 become excessive or too great, due to overexpansion by heat or other causes, it will cause the nipple 34 to be distended beyond its normal position, which, in turn, overcomes the pressure of the spring 38, thus forcing the piston 36 and its rod 37 inwardly, so as to cause the contact 46 to be moved into engagement with the fixed contact 50, thus closing the circuit in substantially the same manner as is affected by the contact 45.

The electrical circuit of the pressure indicator is preferably connected to the other electrical system of the motor vehicle, so that it is necessary for the ignition switch to be turned on before the indicator becomes operative. While both audible and visual signal devices are shown, it is quite obvious that only one of these signals may be employed.

As one of the indicators is mounted on each of the wheels and constitutes a separate electric circuit when the contact members carried thereby are moved into engagement with the fixed contact, it will be seen that each of the bulbs 54, 55, 56 and 57 on the dash may indicate one of the wheels, so that when any one of these circuits is closed, it will notify the driver what particular tire is either over-inflated or deflated.

It will be observed that the pressure indicator may readily be installed on all types and sizes of vehicle wheels and in cases where the wheels are not formed with brake drums the indicators may be suitably mounted so as to be revoluble with the wheel and co-act with a fixed contact to establish a closed circuit when the pressure in the tires exceeds or falls below predetermined limits.

It is to be understood that the form of the invention herewith shown and described is merely illustrative of a preferred embodiment and that such changes may be made as fall within the purview of one skilled in the art without departing from the spirit of the invention and the scope of the appended claims.

What I claim is:

1. A fluid pressure switch for pneumatic tires comprising a movable member, means normally maintaining said member in a relatively fixed position, an operating lever pivotally connected to said member, contact fingers movably connected to said lever on opposite sides thereof, a fixed contact electrically connected to a signaling device, and means operable by the variation in pressure in the tire for moving one of the contact fingers into engagement with said fixed contact to close the circuit and actuate the signaling device.

2. A fluid pressure switch for pneumatic tires comprising a movable member, means normally maintaining said member in a relatively fixed position, an operating lever medially connected to one end of said member, contact fingers loosely connected to said lever and movable relative thereto, a guide means for controlling the movement of said fingers, fixed contact electrically connected to a signaling device, and means operable by the variation in pressure in the tire for moving one of the contact fingers into engagement with said fixed contact to close the circuit and actuate the signaling device.

3. A fluid pressure switch for pneumatic tires comprising a movable horizontal member, yieldable means normally mantaining said member in a relatively fixed position, an operating lever transversely disposed relative to said member and pivotally connected thereto, contact fingers loosely connected to said lever and extending outwardly therefrom, a fixed contact electrically connected to a signaling device, and means operable by said movable member and arranged to engage said fixed contact to close the circuit when the pressure in the tire exceeds or falls below a predetermined limit.

4. In a fluid pressure switch for pneumatic tires, a housing, a reciprocating piston mounted in the housing, means for normally maintaining said piston in a relatively fixed position, a lever connected to said piston and pivoted intermediate its ends to said housing, contact fingers extending outwardly from said housing and operatively connected to said lever, a fixed contact electrically connected to a signaling device and arranged to be engaged by said fingers for closing an electric circuit, and means when the pressure in the tire exceeds or falls below a predetermined limit for actuating said piston to move one of the fingers into engagement with the fixed contacts to close the circuit and actuate the signaling device.

5. In a fluid pressure switch for pneumatic tires, a housing, a reciprocating rod mounted in the housing, a flexible member responsive to the pressure change in the tire for actuating said rod, yieldable means for normally maintaining said rod stationary, a lever loosely connected to one end of said rod, means pivotally connecting the lever to the housing, contact fingers operatively connected to said lever, and a fixed contact electrically connected to a signaling device and arranged to be engaged by said contact fingers.

6. A fluid pressure switch for pneumatic tires comprising a housing directly communicating with the valve stem of the tire, a reciprocating rod mounted in said housing, a horizontally disposed flexible member responsive to the pressure in the tire for actuating said rod, yieldable means for normally maintaining said rod stationary, a horizontal lever transversely disposed relative to said rod and loosely connected medially to one end of the rod, means pivotally connecting said lever to the housing at a point between its connection to the rod and one end thereof, contact fingers loosely connected to said lever on opposite sides of said rod, and a fixed contact electrically connected to a signal device.

7. A fluid pressure switch for pneumatic tires comprising a housing directly communicating with the valve stem of the tire, a reciprocating rod mounted in said housing, a horizontally disposed flexible member responsive to the pressure in the tire for actuating said rod, yieldable means for normally maintaining said rod stationary, a horizontal lever transversely disposed relative to said rod, and provided with a series of longitudinally disposed slots, means loosely connecting said rod to one of the slots, means pivotally connecting said lever to the housing at a point between its connection to the rod and one end thereof, contact fingers normally extending parallel to said rod and on opposite sides thereof, means loosely connecting said contact fingers to complementary slots in said lever, and a fixed contact electrically connected to a signal device.

In testimony whereof I have hereunto set my hand.

ARTHUR C. SMITH.